(12) United States Patent
Wei et al.

(10) Patent No.: US 8,264,796 B2
(45) Date of Patent: Sep. 11, 2012

(54) SUSPENSION FOR RELEASING THERMAL DEFORMATION THEREOF AND SUPPRESSING THERMAL CROWN CHANGE OF A SLIDER MOUNTED THEREON, HEAD GIMBAL ASSEMBLY AND DISK DRIVE UNIT WITH SAME

(75) Inventors: LiDing Wei, Dong Guan (CN); YiCheng Sheng, Dong Guan (CN); JingShu Shi, Dong Guan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 945 days.

(21) Appl. No.: 11/976,947

(22) Filed: Oct. 30, 2007

(65) Prior Publication Data
US 2009/0073611 A1 Mar. 19, 2009

(30) Foreign Application Priority Data
Sep. 14, 2007 (CN) .......................... 2007 1 0147476

(51) Int. Cl.
*G11B 5/48* (2006.01)
*G11B 21/16* (2006.01)

(52) U.S. Cl. .................................................. 360/245.3
(58) Field of Classification Search .................. 360/245, 360/245.1–245.9, 246, 246.1–246.8
See application file for complete search history.

(56) References Cited

U.S. PATENT DOCUMENTS 6,801,398 B1 * 10/2004 Ohwe et al. ............... 360/234.6
2005/0002125 A1    1/2005 Ohwe et al.

* cited by examiner

*Primary Examiner* — Craig A. Renner
*Assistant Examiner* — Gustavo Polo
(74) *Attorney, Agent, or Firm* — Nixon & Vanderhye PC

(57) ABSTRACT

A suspension for a HGA includes a flexure having a suspension tongue with electrical pads adapted for mounting a slider thereon. The suspension tongue has some portions etched with left portions therebetween forming into at least one hinge or spring mechanism for releasing thermal deformation of the suspension tongue and suppressing thermal crown change of the slider. The etched portions have an H-shaped, an M-shaped, an X-shaped, or a stairway configuration, or the like. The invention also discloses a HGA with the suspension and a disk drive unit having such suspension.

13 Claims, 20 Drawing Sheets

SUSPENSION FOR RELEASING THERMAL DEFORMATION THEREOF AND SUPPRESSING THERMAL CROWN CHANGE OF A SLIDER MOUNTED THEREON, HEAD GIMBAL ASSEMBLY AND DISK DRIVE UNIT WITH SAME

This application claims priority to Chinese Application No. 200710147476.8 filed Sep. 14, 2007, the entire contents of which are hereby incorporated by reference in this application.

FIELD OF THE INVENTION

The present invention relates to information recording disk drive devices, and more particularly to a suspension capable of releasing thermal deformation thereof and suppressing thermal crown change of a slider mounted thereon. The present invention also relates to a head gimbal assembly and a disk drive unit with the suspension.

BACKGROUND OF THE INVENTION

One known type of information storage device is a disk drive device that uses magnetic media to store data and a movable read/write head that is positioned over the media to selectively read from or write to the disk.

FIG. 1a illustrates a conventional disk drive device and shows a magnetic disk 101 mounted on a spindle motor 102 for spinning the disk 101. A voice coil motor arm 104 carries a head gimbal assembly (HGA) 100 that includes a slider 103 incorporating a read/write head. A voice-coil motor (VCM, not labeled) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103 and the spinning magnetic disk 101. The lift force is opposed by equal and opposite spring forces applied by the HGA 100 such that a predetermined flying height above the surface of the spinning disk 101 is maintained over a full radial stroke of the motor arm 104.

Now referring to FIGS. 1b-1c, a conventional HGA 100 comprises the slider 103, a suspension 190 to load or suspend the slider 103 thereon. As illustrated, the suspension 190 includes a load beam 106, a base plate 108, a hinge 107 and a flexure 105, all of which are assembled together.

The load beam 106 is connected to the base plate 108 by the hinge 107. A locating hole 112 is formed on the load beam 106 for aligning the load beam 106 with the flexure 105. As best shown in FIG. 1e, a dimple 111 is formed on the load beam 106 to transfer load forces generated by the load beam 106 to the flexure 105 at a position corresponding to a center of the slider 103. By this engagement of the dimple 111 with the flexure 105, the load forces can be transferred to the slider 103 uniformly, thus making the slider 103 working more stably.

The base plate 108 is used to enhance structure stiffness of the whole HGA 100. A mounting hole 113 is formed on end of the base plate 108 for mounting the whole HGA to the motor arm 104 (refer to FIG. 1a). The hinge 107 has a mounting hole 110 formed on its one end corresponding to the mounting hole 113 of the base plate 108, and the hinge 107 is partially mounted to the base plate 108 with the mounting holes 110, 113 aligned with each other. The hinge 107 and the base plate 108 may be mounted together by laser welding at pinpoints 109 distributed on the hinge 107. Two hinge steps 115 are integrally formed at two sides of the hinge 107 at one end adjacent the mounting hole 110 for strengthening stiffness of the hinge 107. In addition, two hinge struts 114 are extended from the other end of the hinge 107 to partially mount the hinge 107 to the load beam 106.

The flexure 105 runs from the hinge 107 to the load beam 106. The flexure 105 has a proximal end 119 adjacent the hinge 107 and a distal end 118 adjacent the load beam 106. A locating hole 117 is formed on the distal end 118 of the flexure 105 and aligned with the locating hole 112 of the load beam 106, thus obtaining a high assembly precision.

FIG. 1d shows the tip part of the flexure 105 and illustrates the top-face side of the flexure 105 on which the slider 103 is mounted. As shown in FIG. 1d, the flexure 105 of the suspension 190 has a suspension tongue 116 with which almost an entire surface of one face of the slider comes in contact and fixed. The suspension tongue 116 is also referred to as a gimbal whose one end is connected to the flexure 105, and the connection part exhibits a spring characteristic which functions to allow the loaded slider 103 to keep a proper flying height with respect to the disk 101.

The suspension tongue 116 and the slider 103 are securely fixed by an adhesive filled therebetween. Further, there are cases of using solder for fixing the slider 103, whether or not the adhesive is used.

FIG. 1e illustrates the slider 103 flying above the magnetic disk 101 when the HDD is working. In a common disk drive unit, the slider flies only approximately a few micro-inches above the surface of the rotating disk. Generally, the flying height "h" of the slider, shown in FIG. 1e, is considered as one of the most critical parameters affecting the disk reading and writing performances. More concretely, a relatively small flying height allows the transducers impeded on the slider to achieve a greater reading/writing resolution between different data bit locations on the disk surface, thus improving data storage capacity of the disk. Therefore, it is desired that the slider have a very small flying height to achieve a higher data storage capacity. At the same time, with the increasing popularity of lightweight and compact notebook type computers that utilize relatively small yet powerful disk drives, the need for a progressively lower and lower flying height has continually grown.

With reduction of the flying height, it is strongly expected that the flying height be kept constant all the time regardless of variable flying conditions, since great variation of flying height will deteriorate reading/writing performance of the slider, and in worse cases even result in data reading/writing failure.

If coefficients of thermal expansion (CTE) of the slider 103 and the flexure 105 are different, the slider 103 may have a warp and distortion in accordance with deformation of the suspension tongue 116 caused by heat. FIG. 2a schematically shows an example thereof. As shown in FIG. 2a, when both ends of the slider 103 are connected to the suspension tongue 116 by the solders 130, the suspension tongue 116 shrinks and changes its shape as shown by arrows of FIG. 2b at a low temperature. In accordance with this, there is a warp (crown) generated in the slider 103. The suspension tongue 116 is extended in arrows of FIG. 2c when the temperature increases, which also causes the slider 103 to have a crown.

The deformation of the slider 103 described above can also happen in the case where the suspension tongue 116 and the slider are securely fixed by adhesive.

FIG. 2f shows a stress distribution of the thermal expansion caused in the flexure 105 when the flexure 105 in the shape of FIG. 1d is heated to 55° C. In this illustration, the part with lighter shading is where more stress is concentrated. From the illustration, it can be seen that the stress concentrates on the soldered part. Thus, the stress is also imposed on the slider 103 that is fixed by solder at that soldered part. In other words, the stress may cause deformation of the magnetic head slider 103 as described above. In a worse case, the solder 130 may be generated a crack 131 under the stress, as shown in FIG. 2d-2e.

The deformation of the slider will cause the variation of the flying height thereof, thereby badly affecting reading/writing performance of the slider. Further, the deformation may cause crack of the solder, thereby cutting the electrical connection of the slider 103 and the flexure 105. Therefore, it is necessary to control the deformation to a tolerant limit.

Referring to FIG. 3, the air bearing surface (ABS) of the slider has morphological characteristics such as a total crown and a cross crown. The total crown is the maximum height of a convex surface provided in the longitudinal direction that is an inflow direction of air to or an outflow direction of air from the slider. The cross crown is the maximum height of a convex surface provided in the cross direction, which is orthogonal to the longitudinal direction. The changes of flying height are affected by the slider total crown and the cross crown simultaneously. Normally, the total crown is more sensitive than cross crown and its criterion is usually less than 1 nm in specification.

Hence, a need has arisen for providing an improved suspension which can release thermal deformation of the suspension tongue and suppress thermal crown change of a slider mounted thereon.

SUMMARY OF THE INVENTION

Accordingly, one objective of the present invention is to provide a suspension capable of releasing thermal deformation of the suspension tongue and, in turn, preventing thermal crown change of the slider, thereby improving the flying performance of the slider.

Another objective of the present invention is to provide a HGA with a suspension which can suppress the thermal crown change of the slider, thus achieving stable writing and reading of data.

Still another objective of the present invention is to provide a HDD with a HGA which is capable of improving the flying performance of the slider, thereby improving the read/writing performance of the HDD.

To achieve the above-mentioned objective, a suspension for a HGA comprises a flexure having a suspension tongue with electrical pads adapted for mounting a slider thereon. The suspension tongue has some portions etched with left portions therebetween forming into at least one hinge or spring mechanism for releasing thermal deformation of the suspension tongue and suppressing thermal crown change of the slider.

The suspension tongue has a trailing portion bonded to a trailing edge of the slider and a leading portion bonded to a leading edge of the slider.

In an embodiment of the suspension according to the present invention, the electrical pads are disposed on the trailing portion and bonded to the trailing edge of the slider by solder or gold ball bonding, and the leading portion are bonded to the leading edge of the slider by epoxy or other adhesive materials.

In another embodiment of the suspension according to the present invention, the electrical pads comprise trailing pads disposed on the trailing portion of the suspension tongue and bonded to the trailing edge of the slider by solder or gold ball bonding and leading pads disposed on the leading portion of the suspension tongue and bonded to the leading edge of the slider by solder or gold ball bonding.

The etched portions comprise a first group of slots defined adjacent to the trailing portion and a second group of slots defined adjacent to the leading portion.

Selectively, the first group of slots is a closed slot semi-surrounding the trailing portion or two closed slots surrounding the trailing portion. The second group of slots forms into a stairway configuration. Selectively, the second group of slots has an H-shaped, M-shaped, or X-shaped configuration.

Furthermore, the second group of slots comprises a pair of one-end-opened slots formed therebetween.

A HGA of the present invention comprises a suspension comprising a flexure having a suspension tongue with electrical pads thereon, and a slider mounted on the suspension tongue by the electrical pads. The suspension tongue has some portions etched with left portions therebetween forming into at least one hinge or spring mechanism for releasing thermal deformation of the suspension tongue and suppressing thermal crown change of the slider.

A HDD of the present invention comprises a HGA, a drive arm connected to the HGA, a disk, and a spindle motor operable to spin the disk. The HGA includes a slider and a suspension supporting the slider. The suspension comprises a flexure having a suspension tongue with electrical pads thereon for mounting the slider. The suspension tongue has some portions etched with left portions therebetween forming into at least one hinge or spring mechanism for releasing thermal deformation of the suspension tongue and suppressing thermal crown change of the slider.

Since the suspension has some portions etched with left portions therebetween forming into hinge or spring mechanism, when the temperature changes, the thermal deformation of the suspension can be released by contracting or expanding constrained in the etched portions which, in turn, suppresses deformation of the slider caused by the mismatch of CTE, thereby improving flying stability of the slider, and finally improving reading/writing characteristics of the slider and performance of the entire disk drive device.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 7b is a partial top plan view of the suspension shown in FIG. 7a;

FIG. 11b is a partial top plan view of the suspension shown in FIG. 11a;

DETAILED DESCRIPTION OF ILLUSTRATED EMBODIMENTS

Figure 1A:
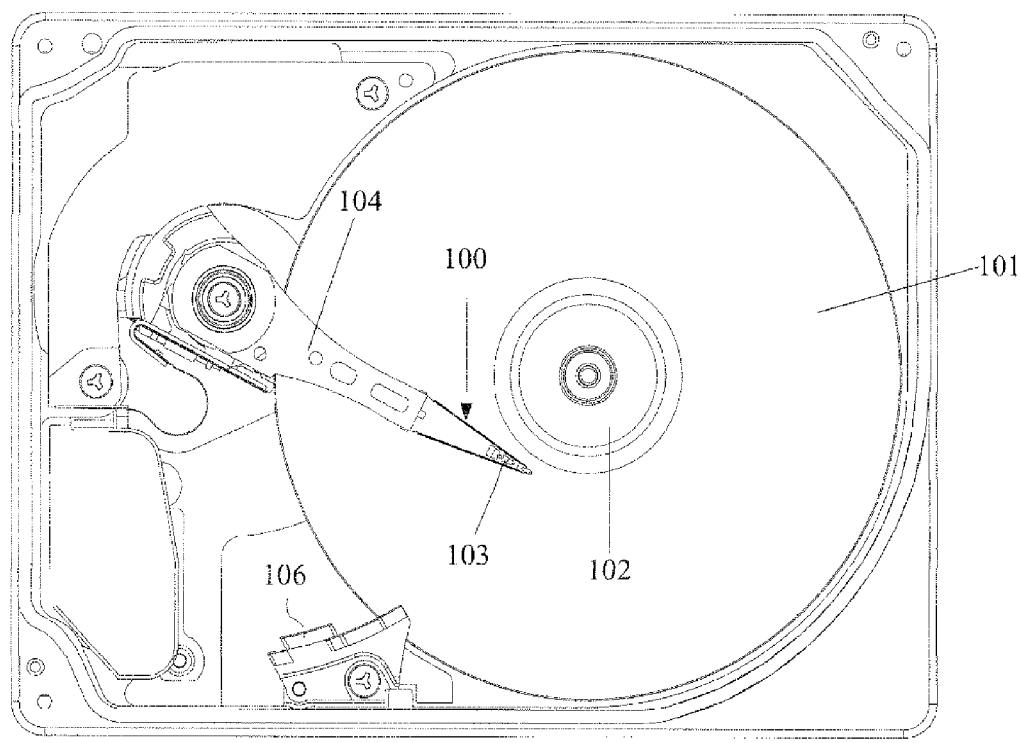
FIG. 1a is a top plan view of a conventional HDD.
Figure 1B:
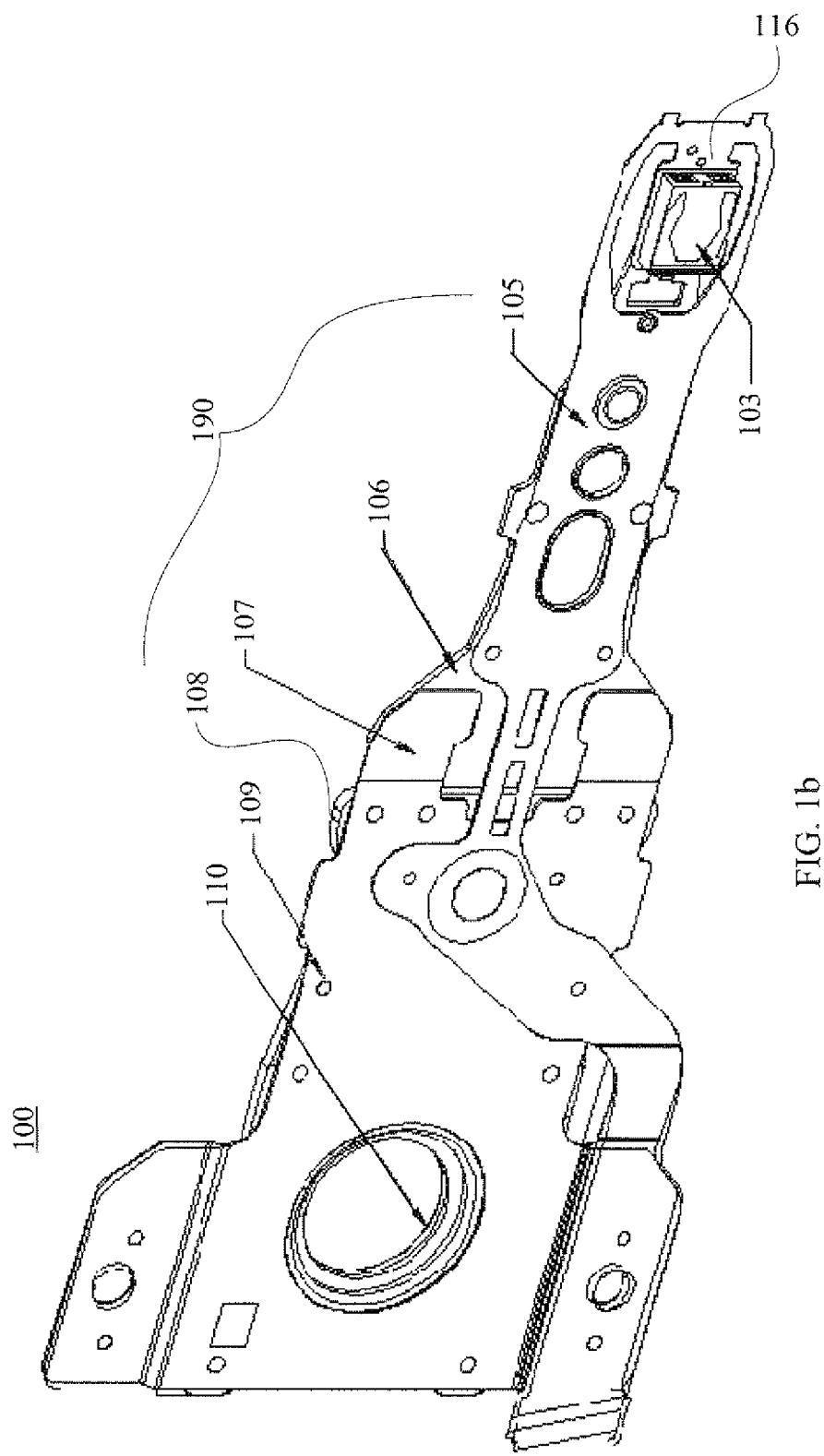
FIG. 1b is a perspective view of a conventional HGA.
Figure 1C:
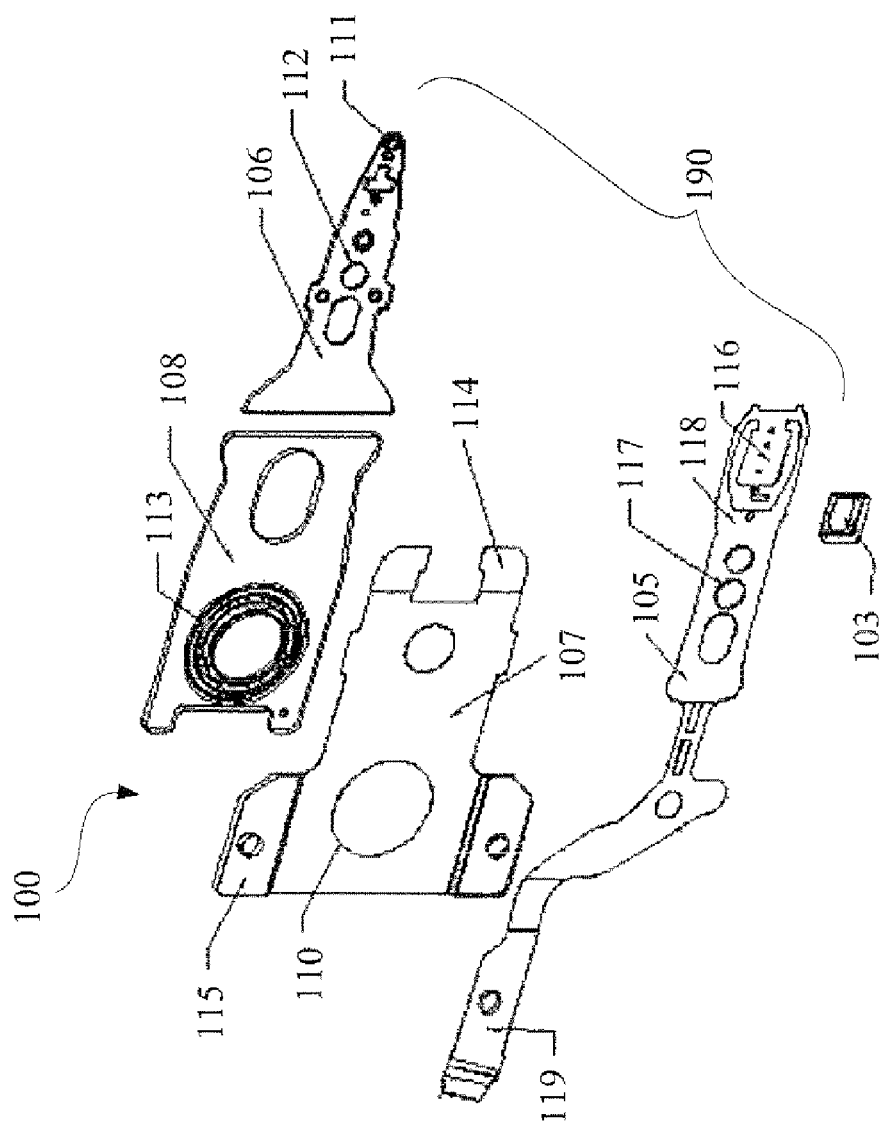
FIG. 1c is an exploded perspective view of the HGA shown in FIG. 1b.
Figure 1D:
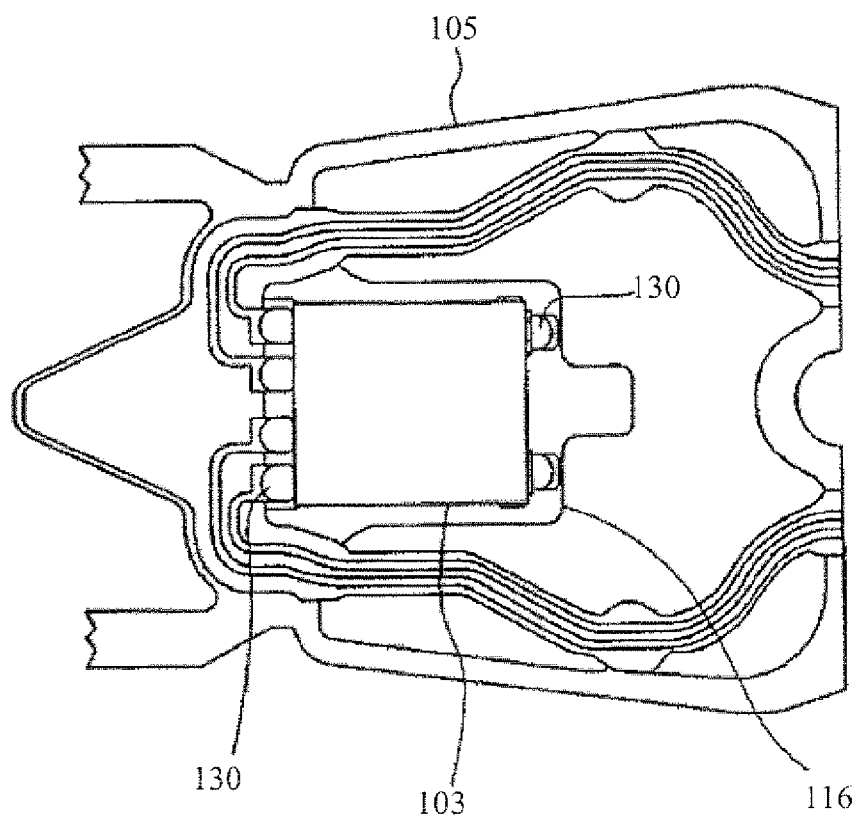
FIG. 1d is a partial top plan view of a flexure of the HGA shown in FIG. 1b.
Figure 1E:
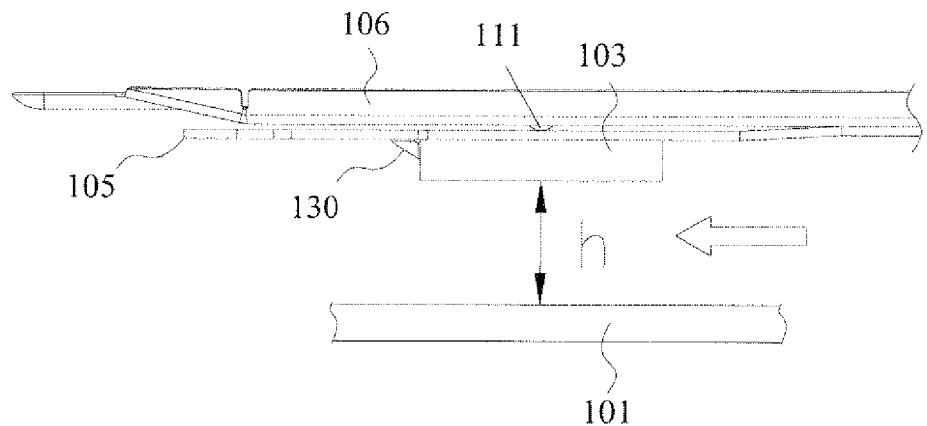
FIG. 1e shows the HGA working above a disk.
Figure 2A:
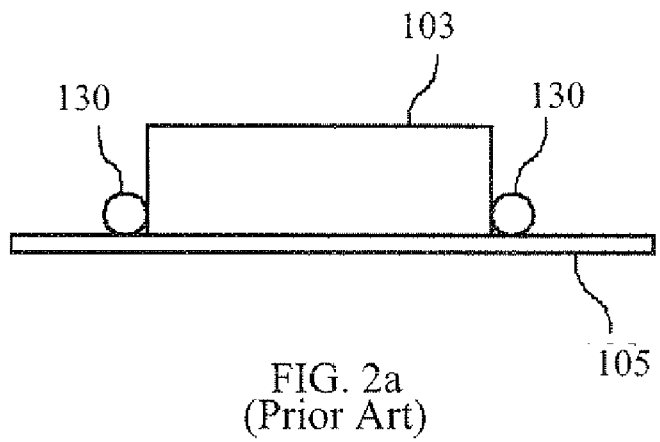
FIG. 2a is a schematic view illustrating the state of a flexure and a slider mounted on the flexure.
Figure 2B:
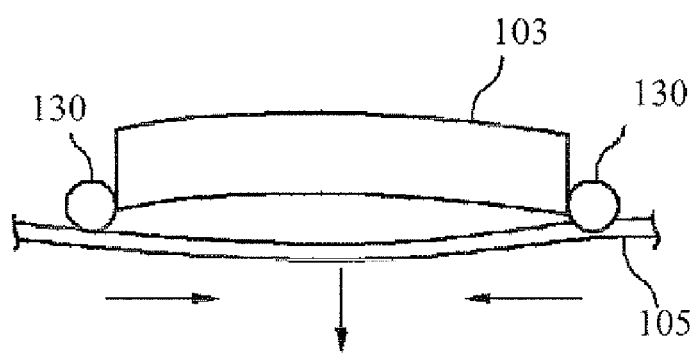
FIG. 2b is a schematic view illustrating the deformation of the slider and the flexure shown in FIG. 2a when environment temperature increases.
Figure 2C:
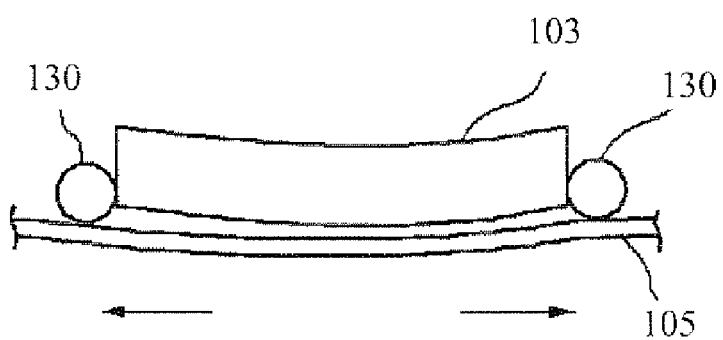
FIG. 2c is a schematic view illustrating the deformation of the slider and the flexure shown in FIG. 2a when environment temperature decreases.
Figure 2D:
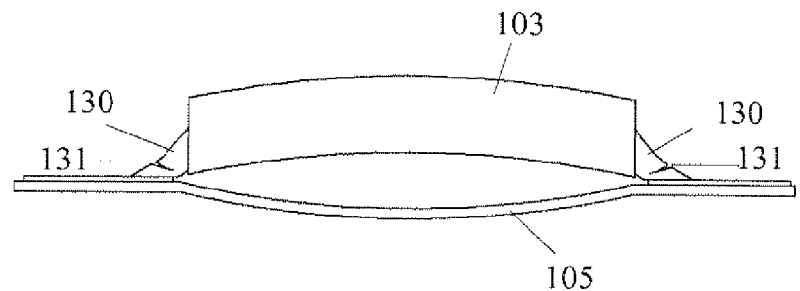
FIG. 2d-2e are schematic views illustrating solder crack under the deformation of the slider and the flexure.
Figure 2E:
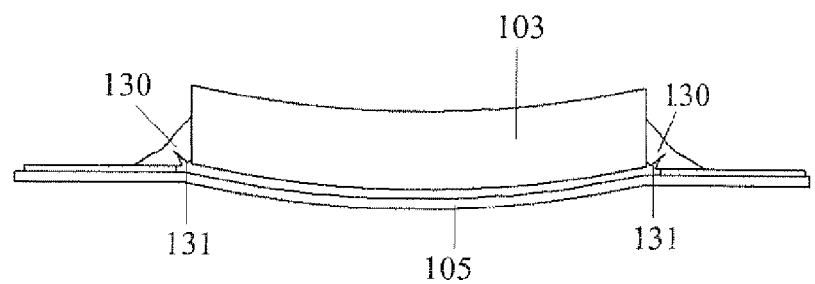
Figure 3:
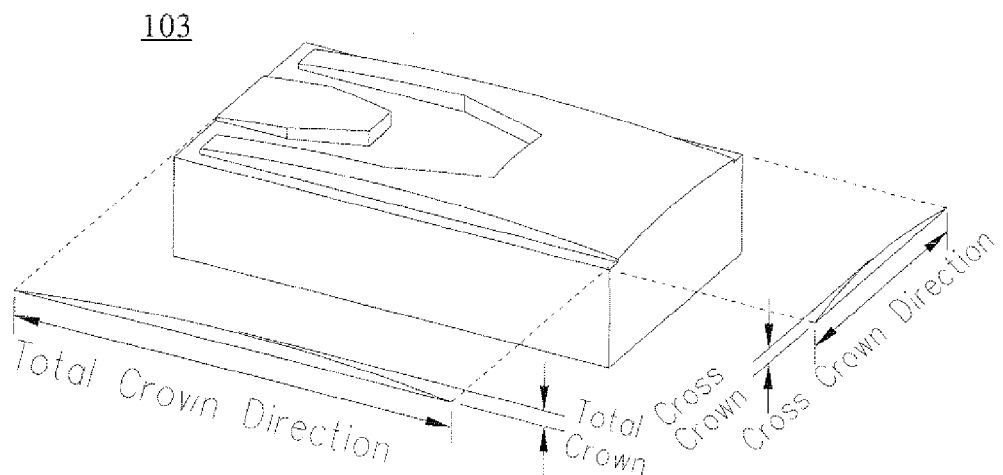
FIG. 3 is a perspective view of a slider and shows the air bearing surface thereof.
Figure 2F:
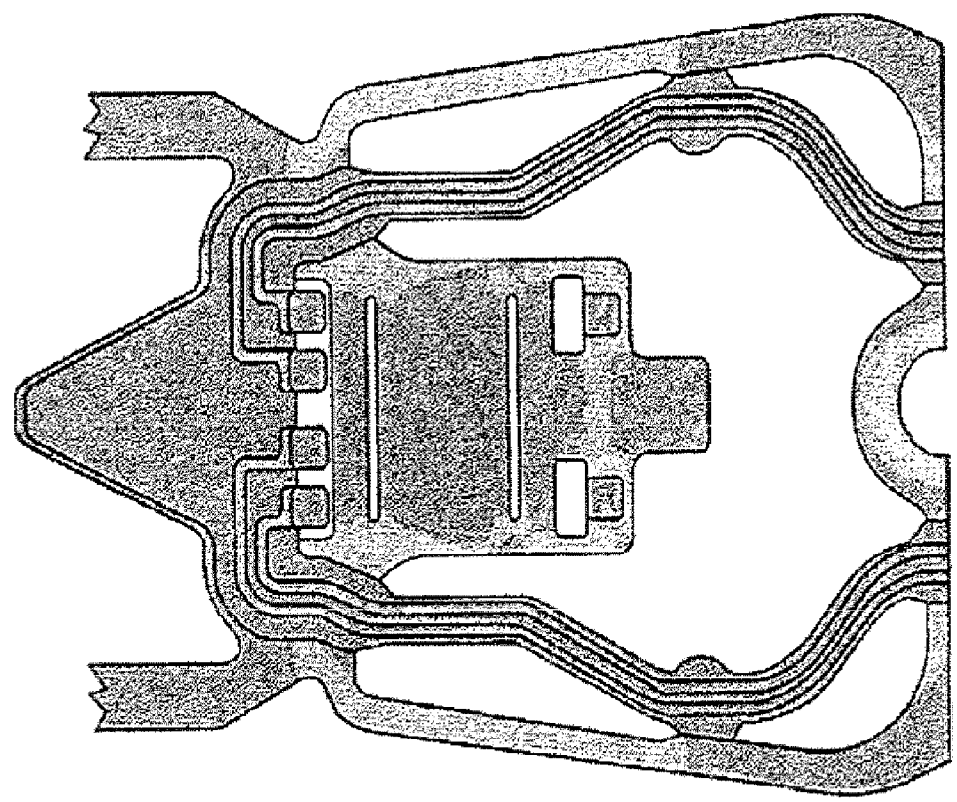
FIG. 2f shows a stress distribution of the thermal expansion caused in the flexure shown in FIG. 1d when it is heated to 55° C.

Various preferred embodiments of the invention will now be described with reference to the figures, wherein like reference numerals designate similar parts throughout the various views. As indicated above, the invention is directed to a suspension capable of releasing thermal deformation thereof and, in turn, preventing or reducing deformation of the slider, thereby improving flying stability of the slider, and finally improving reading/writing characteristics of the slider and performance of entire disk drive device.

Figure 4A:
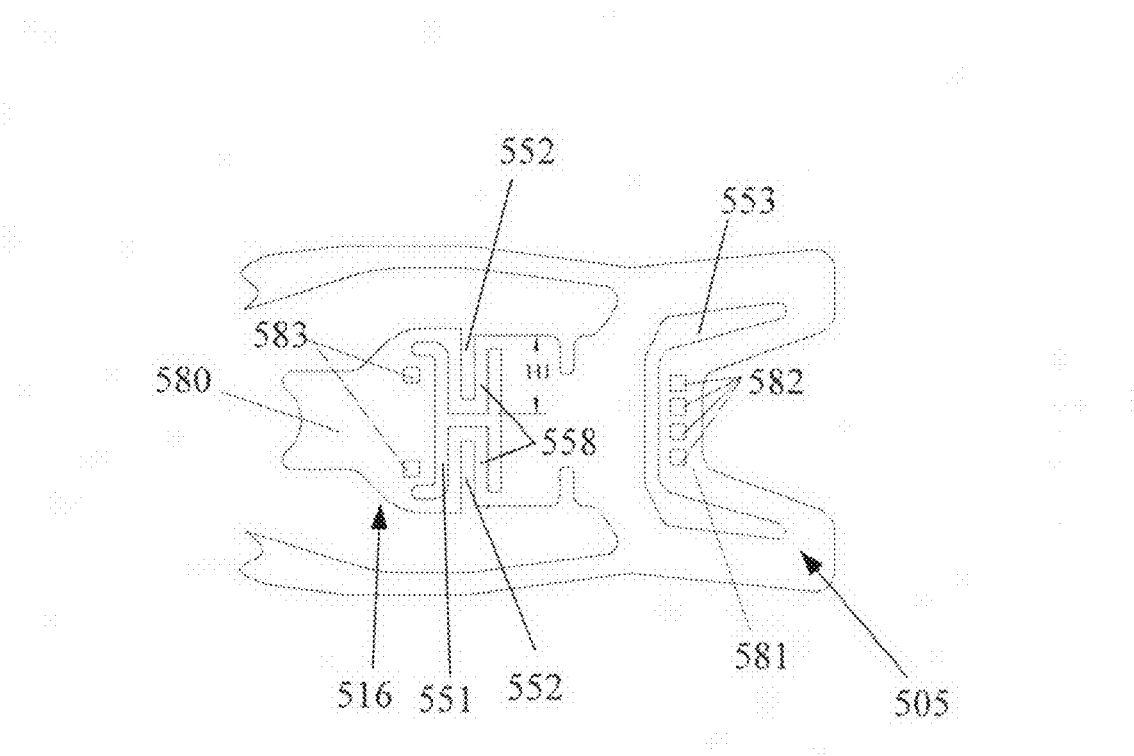
FIG. 4a is a schematic view of a suspension tongue with H-shaped slot according to a first embodiment of the present invention.
Figure 4B:
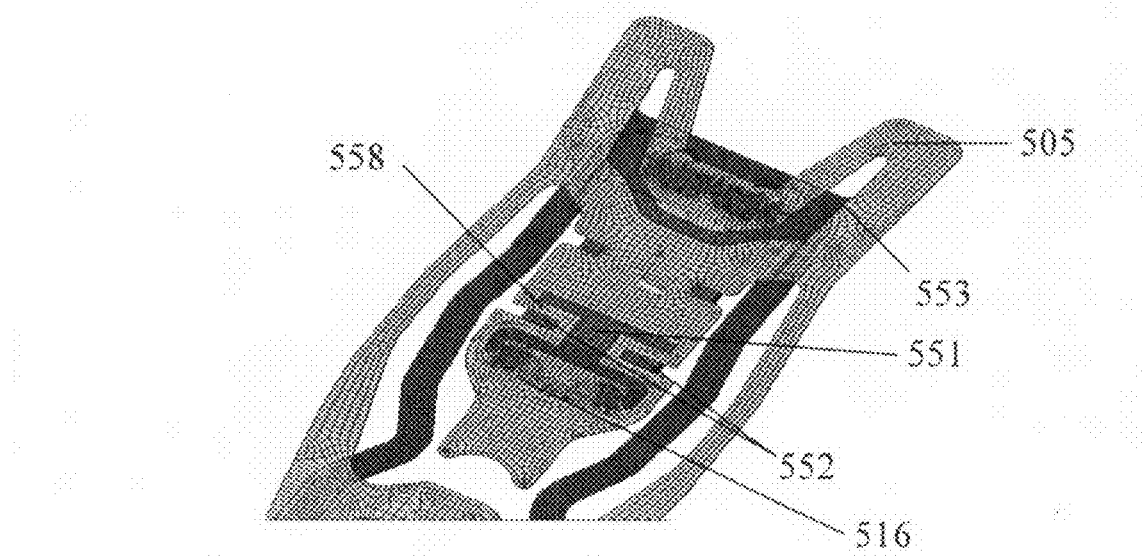
FIG. 4b is a partial top plan view of the suspension with H-shaped slot according to the first embodiment of the present invention.

FIGS. 4a and 4b show a tip portion of the suspension of a first embodiment according to the present invention. As shown in FIG. 4a, the suspension includes a flexure 505 for loading a slider thereon. The flexure 505 has a suspension tongue 516 at a tip portion thereof. The suspension tongue 516 has a trailing portion 581 adapted to be bonded to a trailing edge of the slider and a leading portion 580 adapted to be bonded to a leading edge of the slider. A plurality of electrical pads 582, 583 are disposed on the suspension tongue 518 for electrically connecting the slider. Concretely, in this embodiment, the electrical pads 582, 583 include trailing pads 582 formed on the trailing portion 581 and leading pads 583 formed on the leading portion 580.

The suspension tongue 516 has some portions etched which will be called etched portions hereinafter with left portions therebetween forming into a plurality of hinge or spring mechanisms 558. The etched portions include two groups of slots. The first group of slots of the flexure 505 is a closed slot 553 semi-surrounding the trailing pads 582. The second group of slots that defines the hinge or spring mechanism 558 are slots 551, 552. The slot 551 is H-shaped and formed in a closed-state within the suspension tongue 516 adjacent to the leading pads 583. The two slots 552 each have one end opened, which are called one-end-opened slot, and are formed by cutting two opposite sides of the suspension tongue 516 and extending between two branches of the H-shaped slot 551.

Figure 5A:
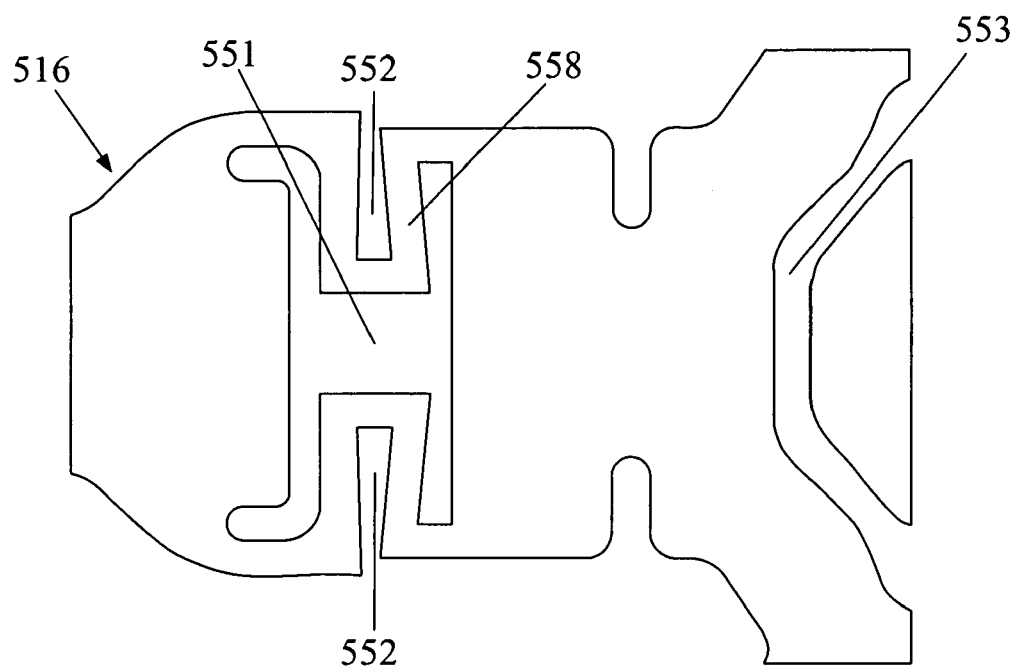
FIG. 5a is a partial top plan view illustrating the state of the suspension with H-shaped slot shown in FIG. 4b when temperature is high.
Figure 5B:
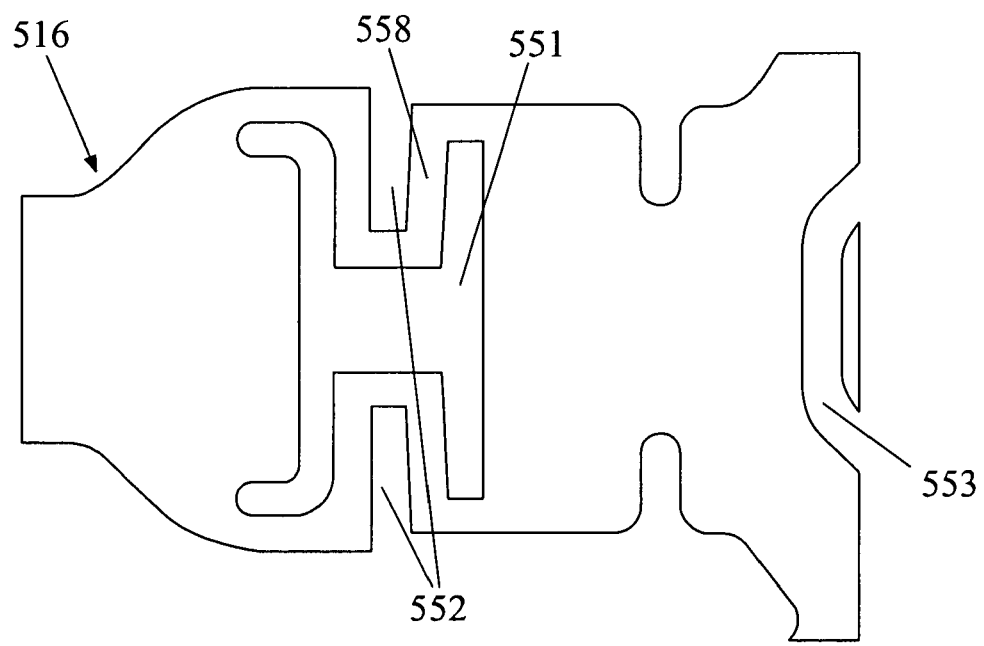
FIG. 5b is a partial top plan view illustrating the state of the suspension with H-shaped slot shown in FIG. 4b when temperature is low.

FIGS. 5a-5b illustrate that how the suspension tongue 516 releases the internal stress and thermal deformation when environment temperature changes. FIG. 5a shows the state of the suspension tongue 516 under high temperature, while FIG. 5b shows the state of the suspension tongue 516 under low temperature. It can be seen that the deformation of the flexure 505 is constrained within the H-shaped slot 551 and the one-end-opened slot 552, and the hinge or spring mechanisms 558 can move to release thermal deformation of the suspension tongue 516 of the flexure 505 so that the bending stress shall not be transferred into the slider directly, thereby preventing or reducing the crown deformation of the slider, finally resulting in maintaining the flying height of the slider.

Figure 6A:
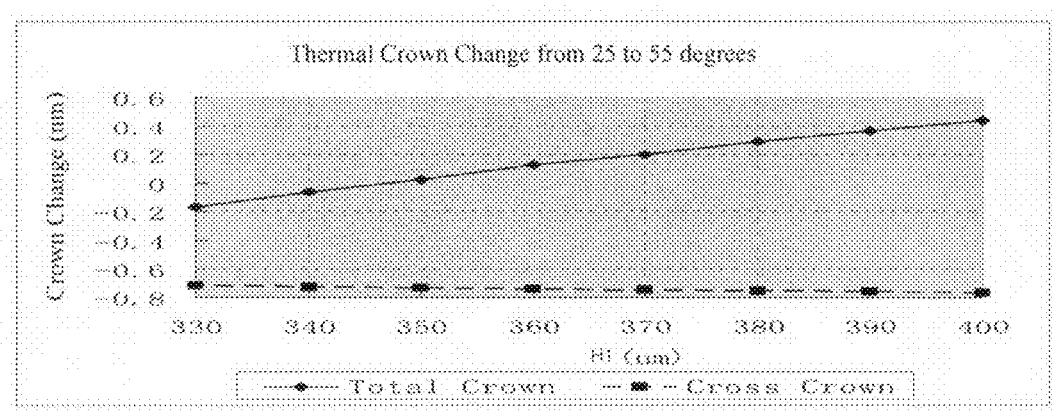
FIG. 6a is a graph showing the relationship between total crown changes of the slider and the length of the movable portion of the hinge or spring mechanism when temperature increases.
Figure 6B:
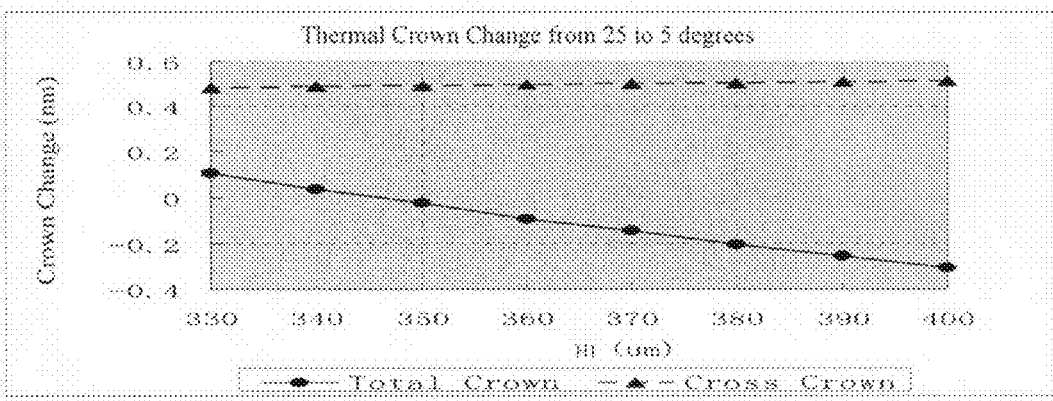
FIG. 6b is a graph showing the relationship between total crown changes of the slider and the length of the movable portion of the hinge or spring mechanism when temperature decreases.

Referring to FIG. 4a again, the length H1 of the movable part of the hinge or spring mechanism 558 of the suspension tongue 516 is a main parameter to reduce the total crown of the slider. In theory, we can decrease the total crown change to zero by adjusting H1 value. FIGS. 6a-6b illustrate the relation between total crown change and value H1 under typical flexure. Based on an epoxy free design with 170 um thin Pemto slider, it is found that when H1 equals to 350 um, slider total crown change can be reduced to zero during temperature rising up to 55 degree C., as shown in FIG. 6a. Similarly, as shown in FIG. 6b, when temperature lowers down, the slider thermal crown change can be neglected too while H1 approaches to 350 um. Although slider's cross crown increases a little higher than usual design, it is still under 1 nm and can be controlled through computer simulation again.

Figure 6C:
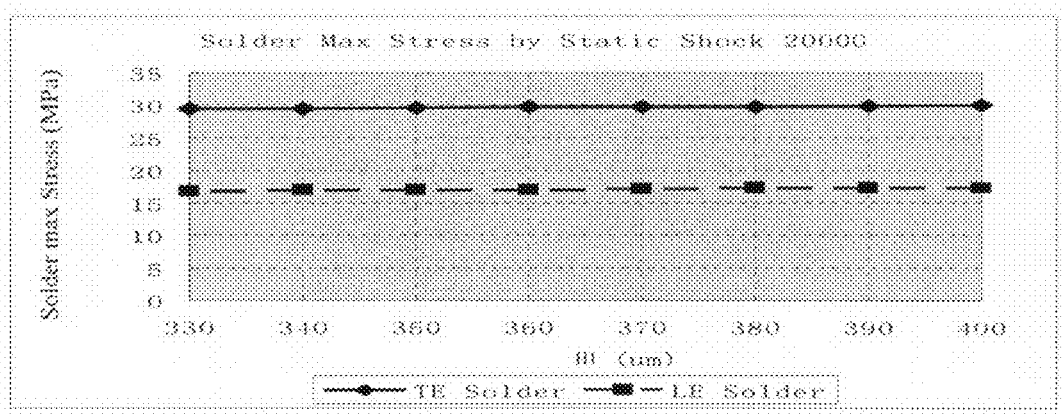
FIG. 6c is a graph showing the maximum stress of the solder or gold ball connecting the suspension with the slider under 2000 G shock.

Referring to FIG. 6c, we can see that the maximum stress, around 30 Mpa, of the solder or gold balls connecting the suspension with the slider is much less than normal design, whose maximum stress is more than 35 Mpa, under 2000 G shock. In other words, this structure can improve mechanical shock performance and control crown changes of the slider much better than normal designs meanwhile.

Figure 7A:
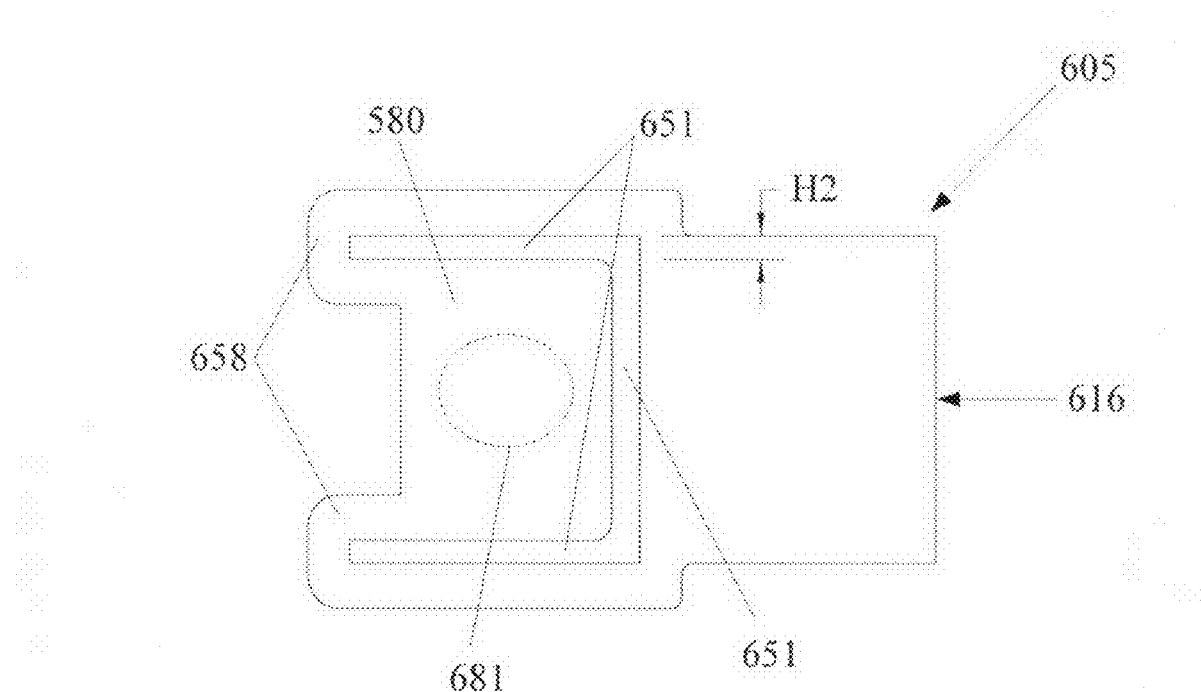
FIG. 7a is a schematic view of a suspension tongue of a flexure of a suspension according to a second embodiment of the present invention.
Figure 7B:
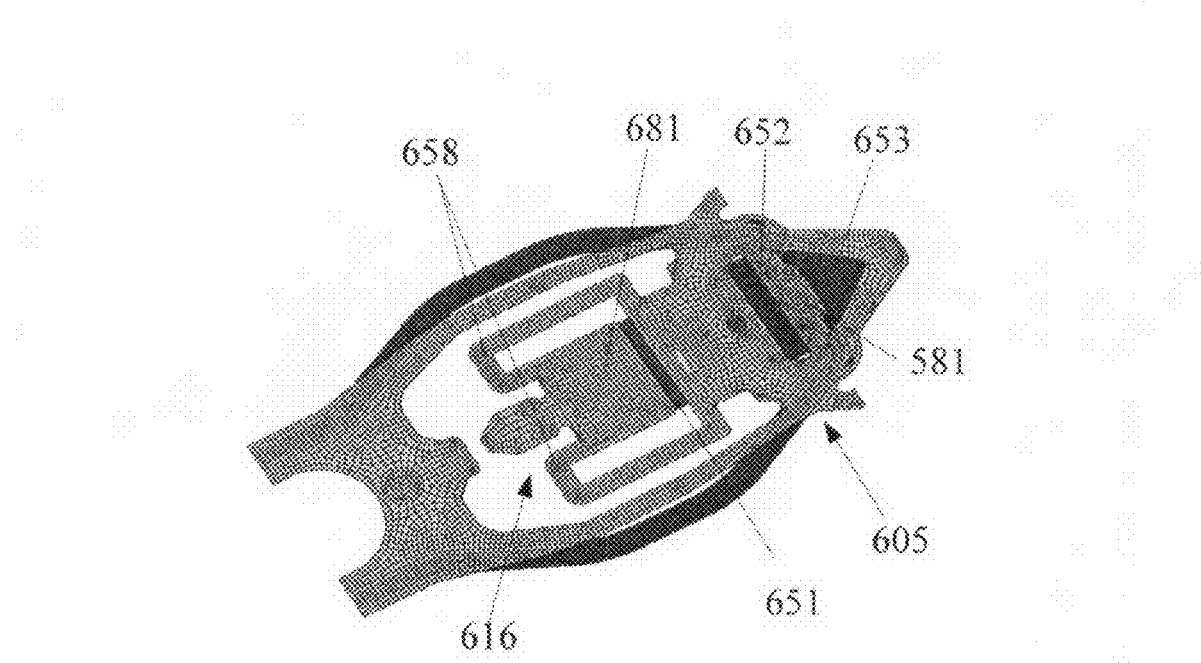

Referring to FIGS. 7a-7b, in the second embodiment of the suspension of the present invention, the hinge or spring mechanisms 658 on the flexure 605 is defined by the second group of slots, that is, an M-shaped slot 651. The first group of slots is two closed slots 652, 653 surrounding the trailing portion 581.

Typically, a slider is bonded to a suspension by epoxy or other adhesive materials and electrically connected at electrical pads between the slider and the suspension, which is called epoxy design. Without epoxy, the slider is attached on the suspension by the solder or gold ball bonding only, which is called epoxy free design.

As shown in FIG. 7a, the area 681 under the leading portion 580 in the dashed line is used to apply adhesive selectively, so the suspension of the second embodiment can be used in both epoxy design and epoxy free design as aforementioned.

Figure 9A:
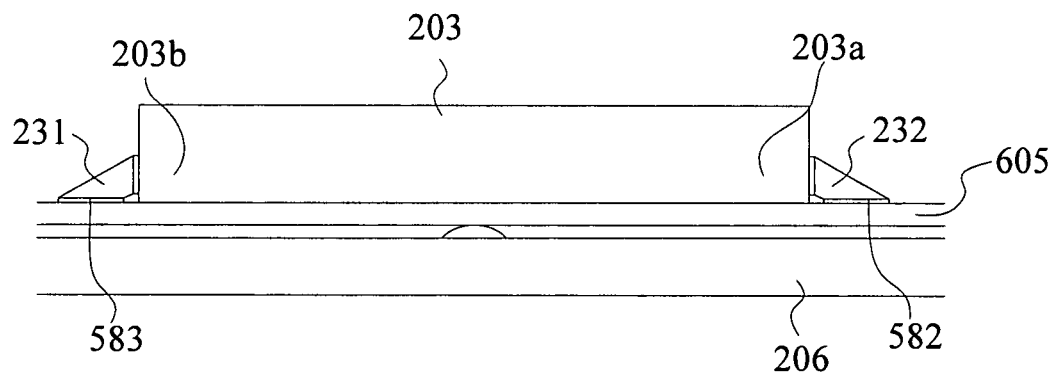
FIG. 9a is a side view showing a slider mounted on the present suspension only by solder or gold ball without using epoxy or other adhesive materials, which will be called epoxy free design hereinafter.
Figure 9B:
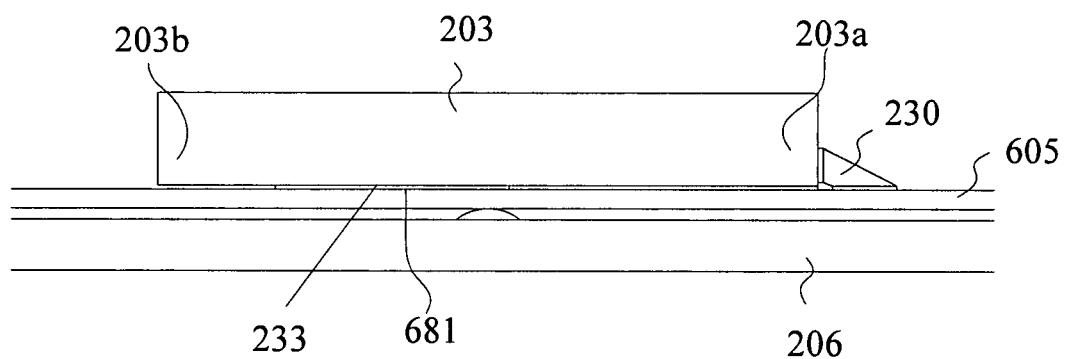
FIG. 9b is a side view showing a slider mounted on the suspension by using epoxy or other adhesive materials between the suspension and the slider, which will be called epoxy design hereinafter.

FIG. 9a shows a slider 203 being mounted on the flexure 505 of the suspension according to the present invention only by solder or gold balls 231, 232, and FIG. 9b shows the slider 203 being fixed to the flexure 605 by epoxy or other adhesive materials 233 except solder or gold ball 230. As shown in FIG. 9a, the trailing edge 203a of the slider 203 is bonded to the trailing pads 582 by the solder or gold ball 232, and the leading edge 203b of the slider 203 is bonded to the leading pads 583 by the solder or gold ball 231. As shown in FIG. 9b, the trailing edge 203a of the slider 203 is bonded to the trailing pads by the solder or gold ball 230, and the leading edge 203b of the slider 203 is bonded to the leading portion 580 by the epoxy or other adhesive materials 233.

Figure 8A:
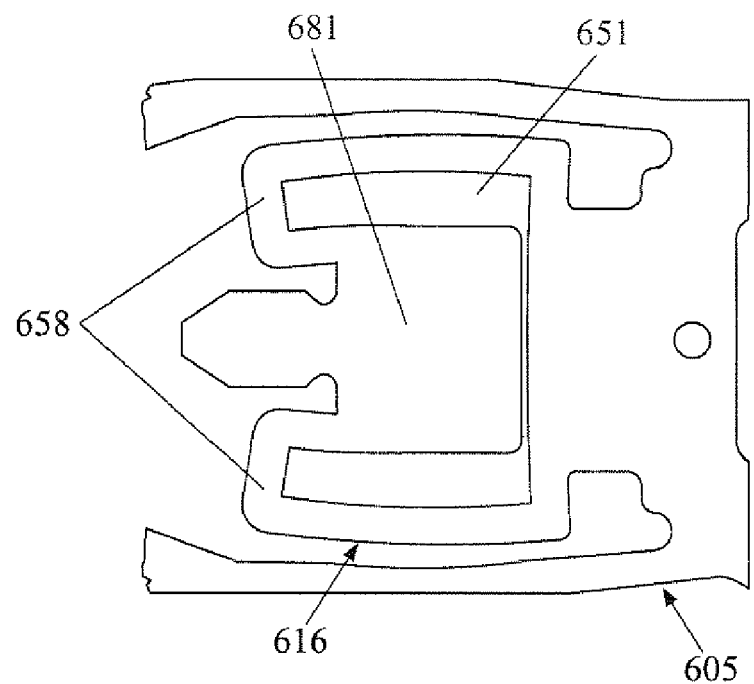
FIG. 8a is a partial top plan view illustrating the state of the suspension shown in FIG. 7b when temperature is high.
Figure 8B:
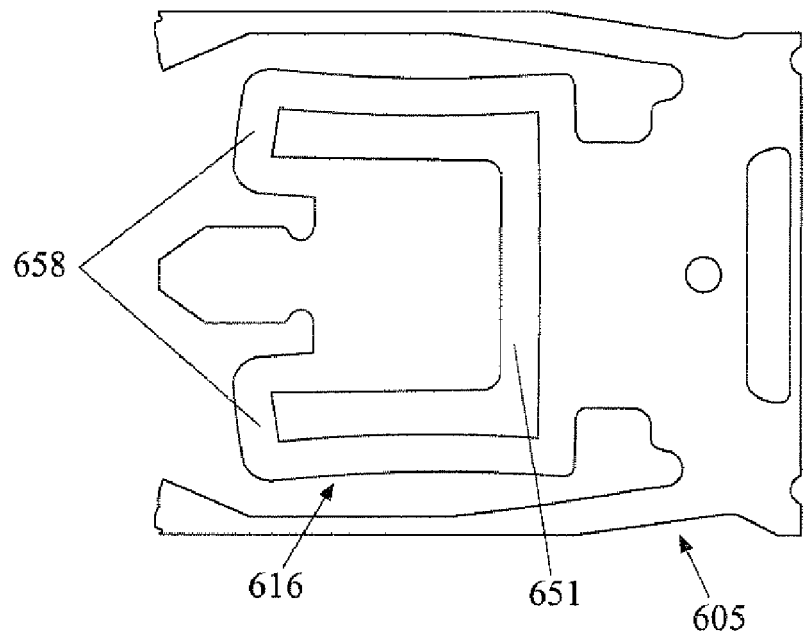
FIG. 8b is a partial top plan view illustrating the state of the suspension shown in FIG. 7b when temperature is low.

FIGS. 8a-8b illustrate the work principle of the suspension of the second embodiment of the present invention. As shown in FIG. 8a, when temperature is high, the suspension tongue 616 expands, and the slot 651 in width of the suspension tongue 616 becomes narrower. When temperature is low, the suspension tongue 616 contracts, and the slot 651 in width of the suspension tongue 616 becomes wider, as shown in FIG. 8b. Similar to the flexure 505, both contract and expand of the flexure 605 are constrained within the hinge or spring mechanism 658 so that the bending stress shall not be transferred into the slider directly, thereby suppressing the thermal crown change of the slider.

Referring to FIG. 7a, the parameter H2, length of the movable portion of the hinge or spring mechanism 658, decides the change of the slider's total crown.

Figure 10A:
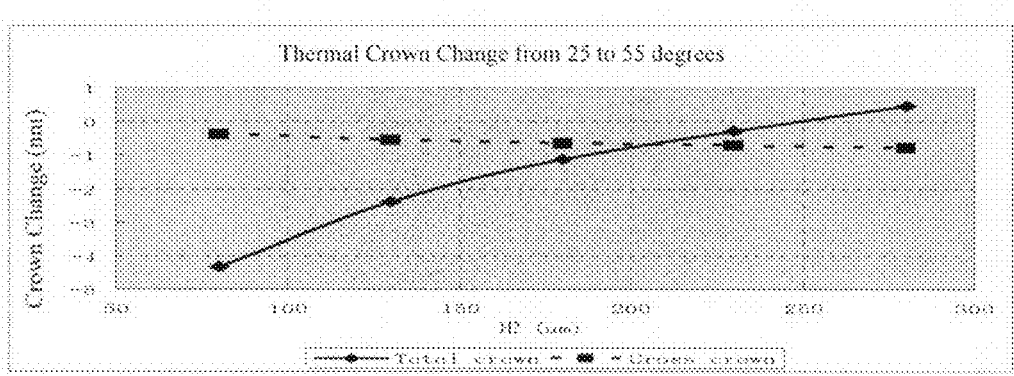
FIG. 10a is a graph for showing the relationship between total crown changes of the slider and the length of the movable portion of the hinge or spring mechanism of the flexure shown in FIG. 7a when temperature increases under the epoxy free design.
Figure 10B:
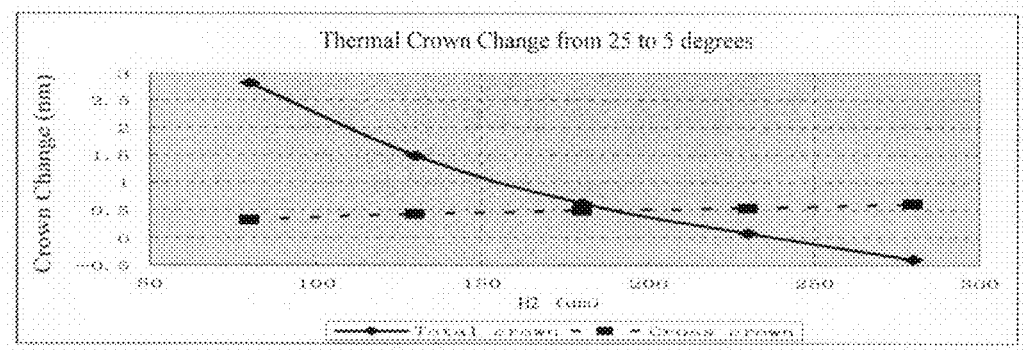
FIG. 10b is a graph for showing the relationship between total crown changes of the slider and the length of the movable portion of the hinge or spring mechanism of the flexure shown in FIG. 7a when temperature increases under the epoxy free design.

FIGS. 10a-10b show the relation between thermal crown changes and H2 values under epoxy free design. Taken a 170 um thin Pemto slider as example too, we can see from the FIG. 10a that when H2 equals to 250 um, slider total crown change can be reduced to zero during temperature rising up to 55 degree C. When temperature is lowered down to 5 degree C., slider thermal crown change can be neglected while H2 approaches to 235 um.

Figure 10C:
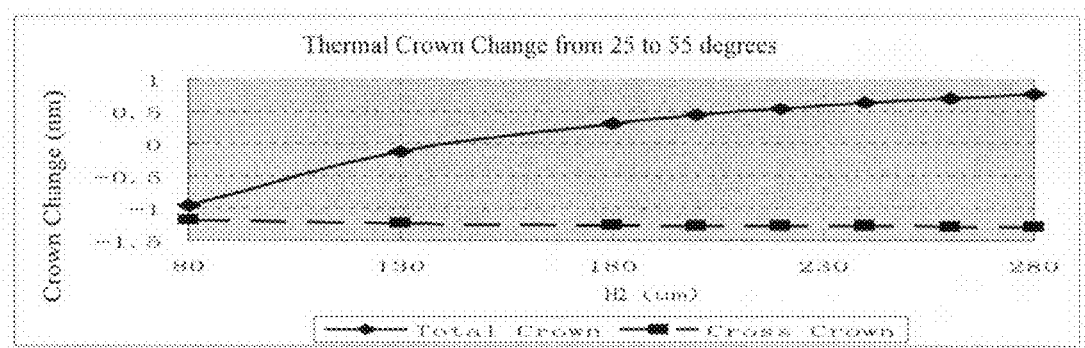
FIG. 10c is a graph for showing the relationship between total crown changes of the slider and the length of the movable portion of the hinge or spring mechanism of the flexure shown in FIG. 7a when temperature increases under the epoxy design.
Figure 10D:
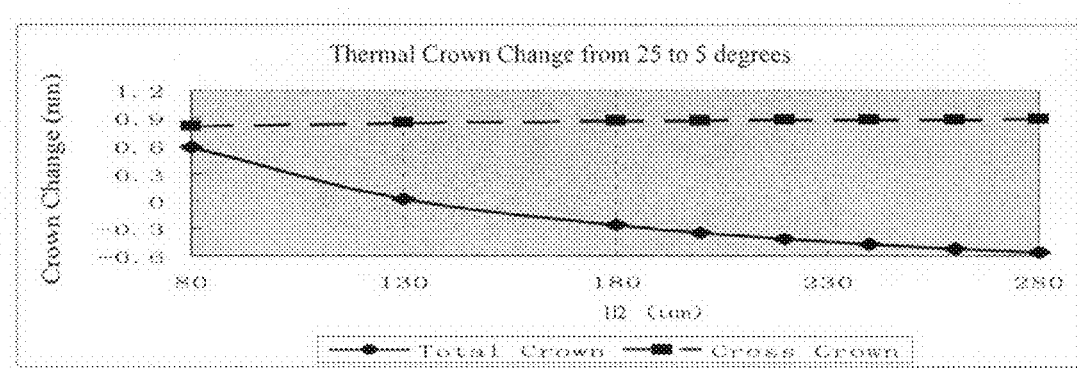
FIG. 10d is a graph for showing the relationship between total crown changes of the slider and the length of the movable portion of the hinge or spring mechanism of the flexure shown in FIG. 7a when temperature increases under the epoxy design.

FIGS. 10c-10d show the relation between thermal crown changes and H2 values under epoxy design. For the 170 um thin Pemto slider, it is found that when H2 equals to 140 um, slider total crown change can be reduced to zero during temperature is raised up to 55 degree C. in FIG. 10c, and when H2 approaches to 135 um, slider thermal crown change can be neglected when temperature is lowered down to 5 degree C. in FIG. 10d.

Figure 11A:
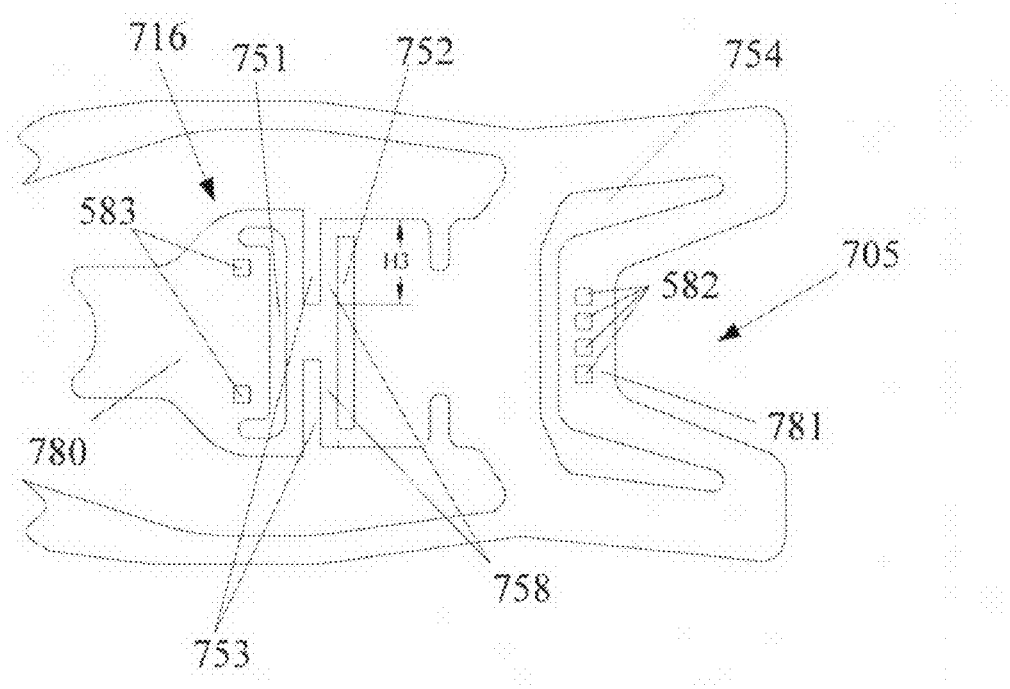
FIG. 11a is a schematic view of a suspension tongue of a flexure of the suspension according to a third embodiment of the present invention.
Figure 11B:
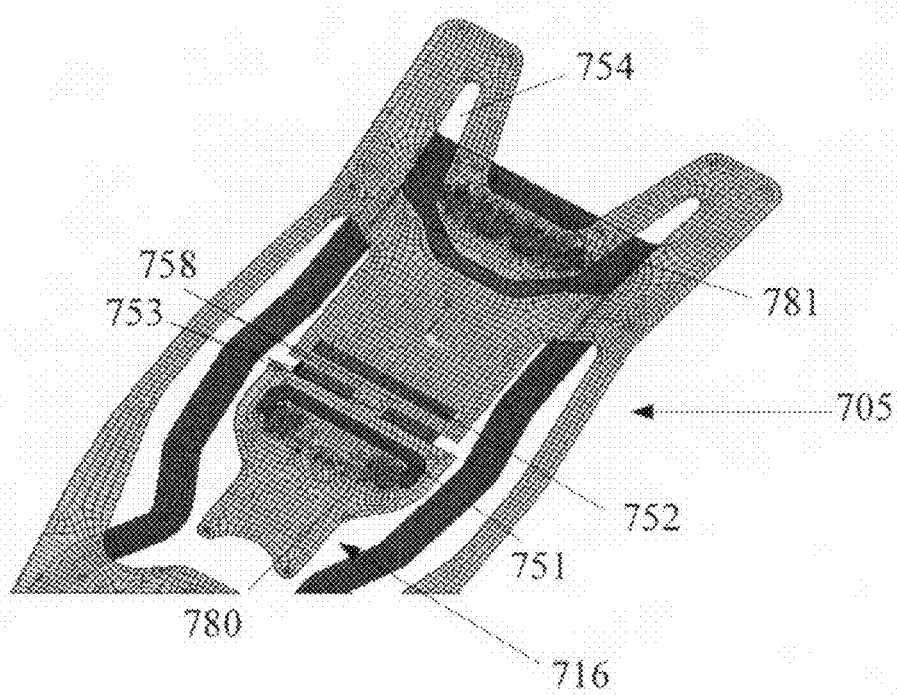

FIGS. 11a-11b show the shape of the etched portions on the flexure 705 of a third embodiment of the suspension according to the present invention. The first group of slots is a closed slot 754 semi-surrounding the trailing portion 781, and the second group of slots is two C-shaped slots 751, 752 back to back to form an X-shaped configuration adjacent to the leading portion 780 and two one-end-opened slots 753 formed between the closed slots 751, 752 by cutting two sides of the suspension tongue 716 respectively.

Figure 12A:
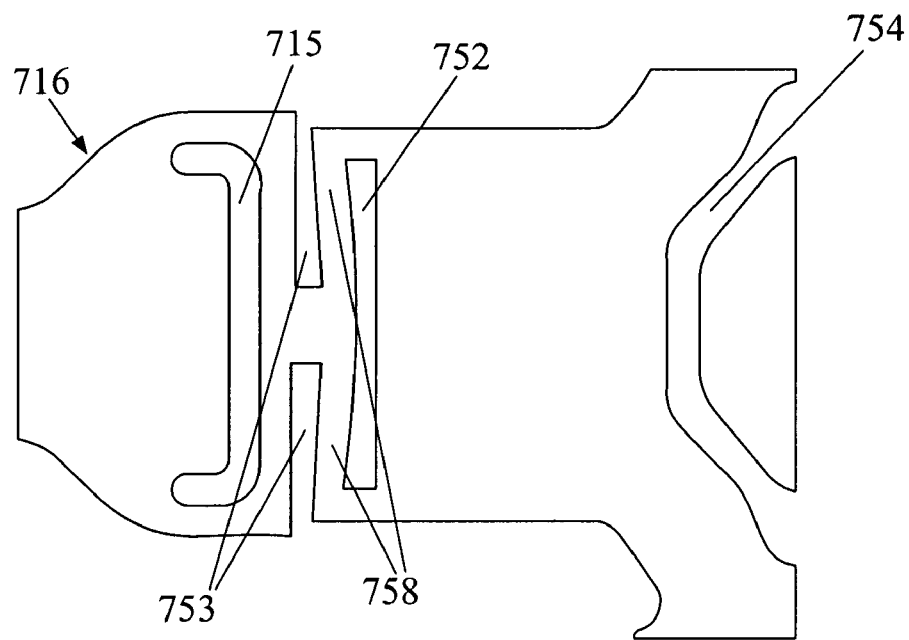
FIG. 12a is a partial top plan view illustrating the state of the suspension shown in FIG. 11b when temperature is high.
Figure 12B:
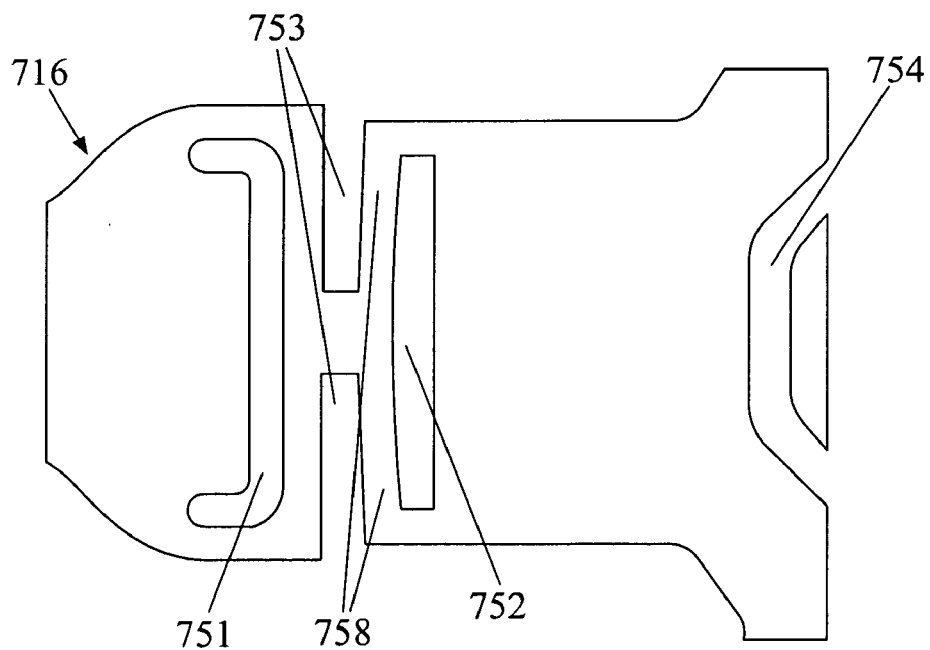
FIG. 12b is a partial top plan view illustrating the state of the suspension shown in FIG. 11b when temperature is low.

Referring to FIG. 12a, when the temperature increases, the suspension tongue 716 expands, and the slot 752 becomes narrower. When temperature decreases, the suspension tongue 716 contracts, and the slot 752 becomes wider, as shown in FIG. 12b. Similar to the flexure 505, both contract and expand of the flexure 705 are constrained within the hinge or spring mechanisms 758 so that the bending stress shall not be transferred into slider directly, thereby preventing the thermal crown change of the slider.

Figure 13A:
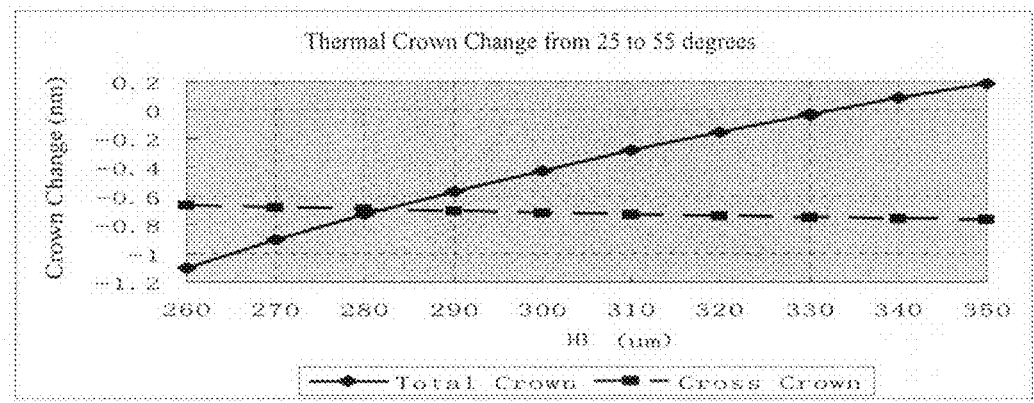
FIG. 13a is graph showing the relationship between total crown changes of the slider and the movable portion of the hinge or spring mechanism of the flexure shown in FIG. 11a when temperature decreases.
Figure 13B:
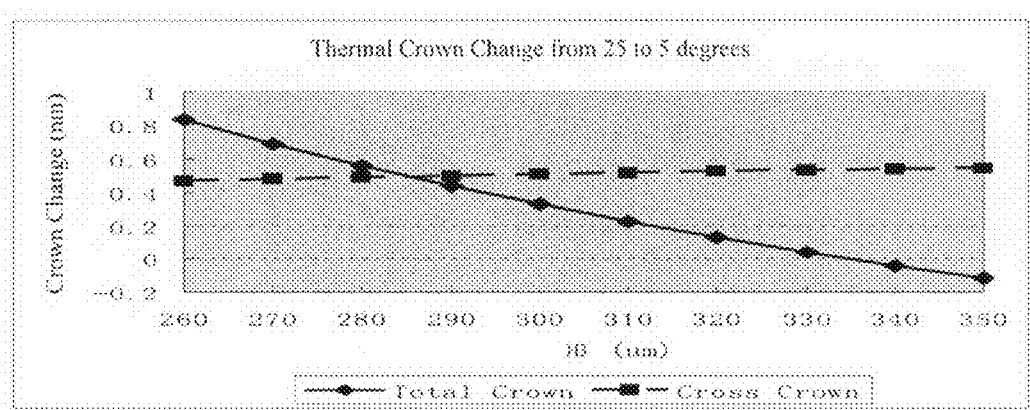
FIG. 13b is a graph showing the relationship between total crown changes of the slider and the movable portion of the hinge or spring mechanism of the flexure shown in FIG. 11a when temperature decreases.

Similar to the suspensions of the first and second embodiments, the length H3 of the movable portion of the hinge or spring mechanism 758 can be adjusted to reduce the crown change of the slider. FIGS. 13a-13b show the relation between thermal crown changes and H3 values. Taken a 170 um thin Pemto slider as example too, we can see from the FIG. 13a that when H3 equals to 335 um, slider total crown can be reduced to zero during temperature rising up to 55 degree C. When temperature is lowered down, slider thermal crown can be neglected while H3 approaches to 335 um. Although slider's cross crown increases a little higher than usual design, it is still under 1 nm and can be controlled through computer simulation again.

The configuration of the etched portions defined on the suspension tongue by through slots is not necessarily the above-mentioned shape, other stairway geometries with one-hinge or multi-hinge mechanical function can be used in order to release the thermal deformation of the suspension and reduce the slider thermal crown change during thermal shock.

Since the suspension has hinge or spring mechanisms as described above, when the temperature changes, the thermal deformation of the suspension can be released by contracting or expanding around the movable portion of the hinge or spring mechanisms which, in turn, prevents or reduces crown deformation of the slider, thereby improving flying stability of the slider, and finally improving reading/writing characteristics of the slider and performance of the entire disk drive device.

Figure 14:
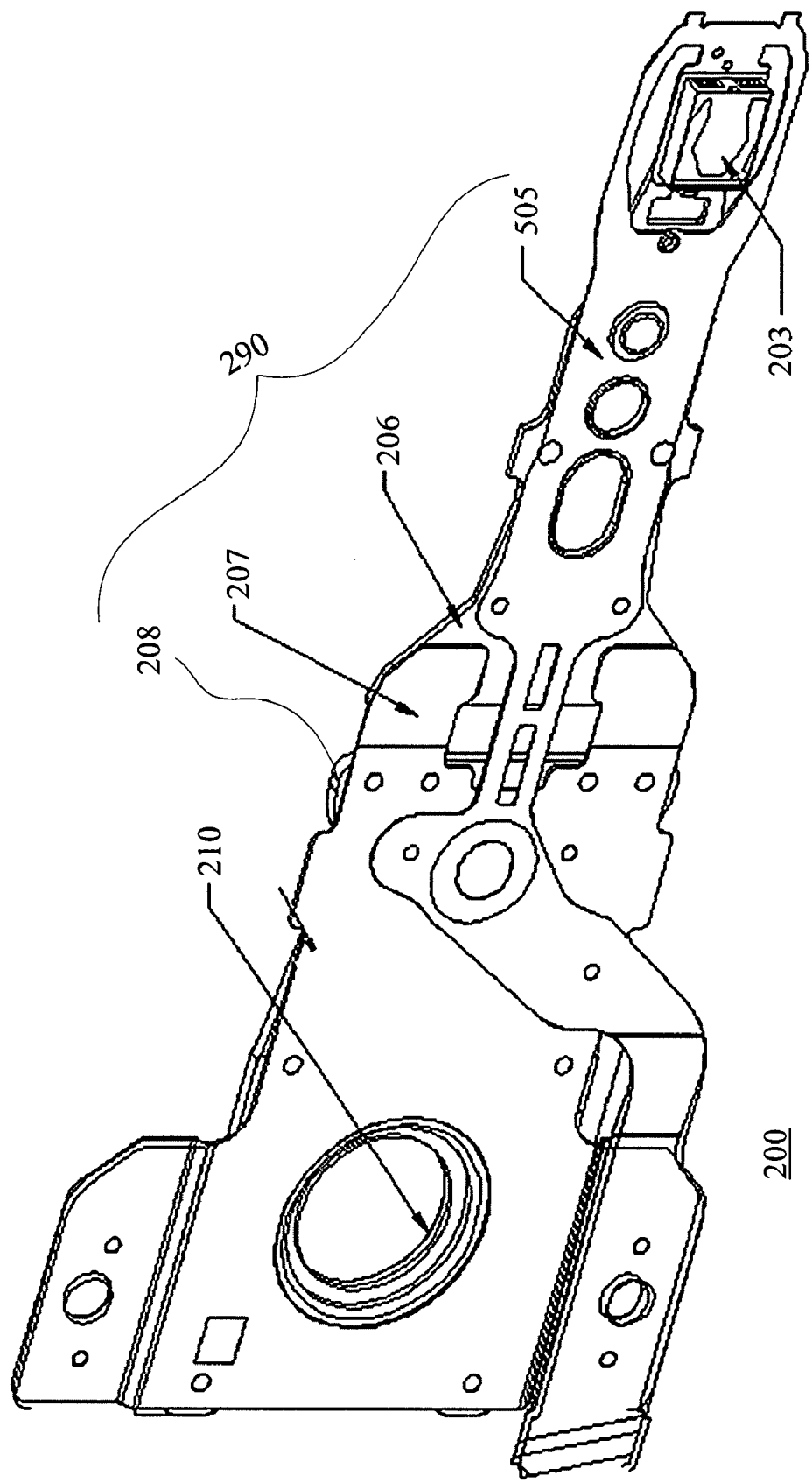
FIG. 14 is a perspective view of a suspension according to an embodiment of the present invention.

Now, referring to FIG. 14, a HGA 200 according to an embodiment of the invention includes a suspension 290 and the slider 203 carried on the suspension 290. The suspension 290 includes a load beam 206, a base plate 208, a hinge 207 and the flexure 505, all of which are assembled with each other. The hinge 207 has a mounting hole 210 formed thereon to assembly the hinge 207 to the base plate 208. The slider 203 is carried on the flexure 505. It is noted that the flexure may also be flexure 605, 705 of the embodiments described above.

Figure 15:
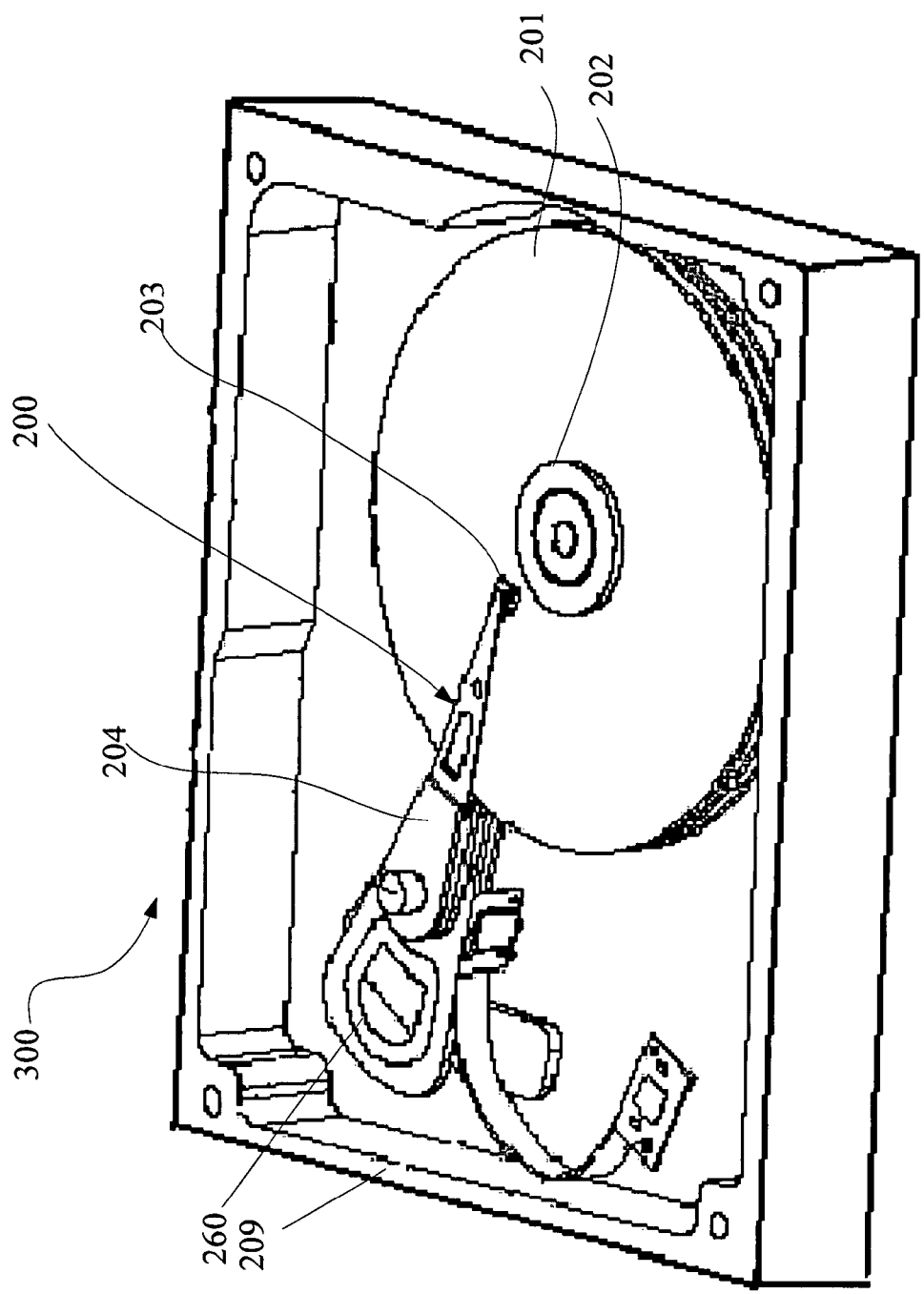
FIG. 15 is a perspective view of a HDD according to an embodiment of the present invention.

Referring to FIG. 15, according to an embodiment of the present invention, a disk drive unit 300 can be attained by assembling a housing 209, a disk 201, a spindle motor 202 for spinning the disk 201, a voice coil motor 260, and a drive arm 204 connected to the HGA 200 of the present invention. Because the structure and the assembly process of disk drive unit are well known to persons ordinarily skilled in the art, a detailed description of such structure and assembly is omitted herefrom.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A suspension for a head gimbal assembly comprising:
a flexure having a suspension tongue with electrical pads adapted for mounting a slider thereon;
wherein the suspension tongue has some portions etched with remaining portions therebetween forming into at least one hinge or spring mechanism for releasing thermal deformation of the suspension tongue and suppressing thermal crown change of the slider, the etched portions comprising a first group of slots which comprise an H-shaped slot and two one-end-opened slots formed by cutting two opposite sides of the suspension tongue and formed between two parallel branches of the H-shaped slot, and the one-end-opened slots paralleling the parallel branches respectively.

2. The suspension as claimed in claim 1, wherein the suspension tongue has a trailing portion adapted to be bonded to a trailing edge of the slider and a leading portion adapted to be bonded to a leading edge of the slider, the first group of slots being adjacent to the leading portion.

3. The suspension as claimed in claim 2, wherein the electrical pads are disposed on the trailing portion and bonded to the trailing edge of the slider by solder or gold ball bonding, and the leading portion is bonded to the leading edge of the slider by epoxy or other adhesive materials.

4. The suspension as claimed in claim 2, wherein the electrical pads comprise trailing pads disposed on the trailing portion of the suspension tongue and bonded to the trailing edge of the slider by solder or gold ball bonding and leading pads disposed on the leading portion of the suspension tongue and bonded to the leading edge of the slider by solder or gold ball bonding.

5. The suspension as claimed in claim 2, wherein the etched portions further comprise a second group of one or more slots defined adjacent to the trailing portion.

6. The suspension as claimed in claim 5, wherein the second group is a closed slot semi-surrounding the trailing portion.

7. A head gimbal assembly comprising:
a suspension comprising a flexure having a suspension tongue with electrical pads thereon;
a slider mounted on the suspension tongue by the electrical pads;
wherein the suspension tongue has some portions etched with remaining portions therebetween forming into at least one hinge or spring mechanism for releasing thermal deformation of the suspension tongue and suppressing thermal crown change of the slider, the etched portions comprising a first group of slots which comprise an H-shaped slot and two one-end-opened slots formed by cutting two opposite sides of the suspension tongue and formed between two parallel branches of the H-shaped slot, and the one-end-opened slots paralleling the parallel branches respectively.

8. The head gimbal assembly as claimed in claim 7, wherein the suspension tongue has a trailing portion bonded to a trailing edge of the slider and a leading portion bonded to a leading edge of the slider, the first group of slots being adjacent to the leading portion.

9. The head gimbal assembly as claimed in claim 8, wherein the electrical pads are disposed on the trailing portion and bonded to the trailing edge of the slider by solder or gold ball bonding, and the leading portion is bonded to the leading edge of the slider by epoxy or other adhesive materials.

10. The head gimbal assembly as claimed in claim 8, wherein the electrical pads comprise trailing pads disposed on the trailing portion of the suspension tongue and bonded to the trailing edge of the slider by solder or gold ball bonding and leading pads disposed on the leading portion of the suspension tongue and bonded to the leading edge of the slider by solder or gold ball bonding.

11. The head gimbal assembly as claimed in claim 8, wherein the etched portions further comprise a second group of one or more slots defined adjacent to the trailing portion.

12. The head gimbal assembly as claimed in claim 11, wherein the second group is a closed slot semi-surrounding the trailing portion.

13. A disk drive unit comprising:
a head gimbal assembly including a slider and a suspension supporting the slider;
a drive arm connected to the head gimbal assembly;
a disk; and
a spindle motor operable to spin the disk;
wherein the suspension comprising:
a flexure having a suspension tongue with electrical pads thereon for mounting the slider;
wherein the suspension tongue has some portions etched with remaining portions therebetween forming into at least one hinge or spring mechanism for releasing thermal deformation of the suspension tongue and suppressing thermal crown change of the slider, the etched portions comprising a first group of slots which comprise an H-shaped slot and two one-end-opened slots formed by cutting two opposite sides of the suspension tongue and formed between two parallel branches of the H-shaped slot, and the one-end-opened slots paralleling the parallel branches respectively.

* * * * *